(12) United States Patent
Amano (10) Patent No.: US 11,236,239 B2
(45) Date of Patent: Feb. 1, 2022

(54) STABLE THERMOCHROMICS POLYMER FILMS WITH VANADIUM DIOXIDE NANOWIRES

(71) Applicant: Konica Minolta Business Solutions U.S.A., Inc., San Mateo, CA (US)

(72) Inventor: Jun Amano, Hillsborough, CA (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 801 days.

(21) Appl. No.: 15/858,069

(22) Filed: Dec. 29, 2017

(65) Prior Publication Data

US 2018/0118958 A1 May 3, 2018

Related U.S. Application Data

(62) Division of application No. 15/011,397, filed on Jan. 29, 2016, now abandoned.

(Continued)

(51) Int. Cl.
| | |
|---|---|
| *C09D 5/26* | (2006.01) |
| *B29C 71/00* | (2006.01) |
| *B29C 48/08* | (2019.01) |
| *B29C 48/00* | (2019.01) |
| *C08K 9/02* | (2006.01) |

(Continued)

(52) U.S. Cl.
CPC ............ *C09D 5/26* (2013.01); *B29C 48/0018* (2019.02); *B29C 48/08* (2019.02); *B29C 71/0072* (2013.01); *B29C 71/0081* (2013.01); *C08K 7/08* (2013.01); *C08K 9/02* (2013.01); *B29C 71/04* (2013.01); *B29C 2035/0822* (2013.01); *B29K 2067/003* (2013.01); *B29K 2105/162* (2013.01); *B29K 2505/08* (2013.01); *B29K 2995/0018* (2013.01); *C08K 3/22* (2013.01); *C08K 2201/003* (2013.01); *C08K 2201/011* (2013.01)

(58) Field of Classification Search
None
See application file for complete search history.

(56) References Cited

U.S. PATENT DOCUMENTS

| | | | | |
|---|---|---|---|---|
| 2,246,087 | A | * | 6/1941 | Bailey ..................... B29D 7/01 |
| | | | | 359/487.02 |
| 3,734,994 | A | * | 5/1973 | Blecha .................. B29C 55/065 |
| | | | | 264/288.4 |

(Continued)

FOREIGN PATENT DOCUMENTS

| | | |
|---|---|---|
| CN | 101955752 A | 1/2011 |
| WO | WO-2014-069675 A1 * | 5/2014 |

OTHER PUBLICATIONS

Ivan P. Parkin et al.: Intelligent Thermochromic Windows, Journal of Chemical Education vol. 83 No. 3, p. 393-400, Mar. 2006.*

(Continued)

*Primary Examiner* — Matthew J Daniels
*Assistant Examiner* — Mohammad M Ameen
(74) *Attorney, Agent, or Firm* — Osha Bergman Watanabe & Burton LLP (57) ABSTRACT

A thermochromic device includes a film and a number of vanadium dioxide nanowires disposed within the film. The film is manufactured by hot extruding a material that includes a polymer and a plurality of vanadium dioxide nanowires on a drum to form a rough film.

10 Claims, 12 Drawing Sheets

Related U.S. Application Data (60) Provisional application No. 62/129,363, filed on Mar. 6, 2015.

(51) Int. Cl.
  *C08K 7/08* (2006.01)
  *B29K 105/16* (2006.01)
  *B29K 505/08* (2006.01)
  *B29K 67/00* (2006.01)
  *B29C 71/04* (2006.01)
  *B29C 35/08* (2006.01)
  *C08K 3/22* (2006.01)

(56) References Cited

U.S. PATENT DOCUMENTS

| | | | |
|---|---|---|---|
| 2010/0314617 A1 | 12/2010 | Ito | |
| 2012/0301642 A1* | 11/2012 | Roberts | G02B 5/208 428/34 |
| 2013/0101848 A1* | 4/2013 | Banerjee | C09K 11/691 428/402 |
| 2015/0274761 A1* | 10/2015 | Sagisaka | C07F 9/58 359/273 |

OTHER PUBLICATIONS

Hong Ye et al. :"The demonstration and simulation of the application performance of the vanadium dioxide single glazing", Solar Energy Materials & Solar Cells, 117 (2013), p. 168-173 (Year: 2013).*

C. G. Granqvist: "Progress in chromogenics: New results for electrochromic and thermochromic materials and devices", Solar Energy Materials & Solar Cells, 93 (2009), p. 2032-2039 (Year: 2009).*

Office Action issued in related U.S. Appl. No. 15/011,397 dated Jun. 15, 2018 (12 pages).

Office Action issued in corresponding U.S. Appl. No. 15/011,397 dated Nov. 5, 2018 (10 pages).

GA Niklasson, S-Y Li and CG Granqvist, Thermochromic vanadium oxide thin films: Electronic and optical properties, Journal of Physics: Conference Series 559 (2014) 012001 (Year: 2014) (9 pages).

Office Action issued in corresponding U.S. Appl. No. 15/011,397 dated Feb. 1, 2018 (12 pages).

Horrocks, G. A. et al., "Scalable Hydrothermal Synthesis of Free-Standing VO2 Nanowires in the M1 Phase," ACS Applied Matters & Interfaces 2014, 6, p. 15726-1732 (7 pages).

Office Action issued in corresponding U.S. Appl. No. 15/011,397 dated Mar. 28, 2019 (12 pages).

Gregory A. Horrocks, et al.; "Scalable Hydrothermal Synthesis of Free-Standing VO2 Nanowires in the M1 Phase" ACS Appl. Mater. Interfaces; 2014 (7 pages).

Kate E. Pelcher, et al.; "Silica-shell encapsulation and adhesion of VO2 nanowires to glass substrates: integrating solution-derived VO2 nanowires within thermally responsive coatings"; Materials Research Express 1; 2014 (12 pages).

Luisa Whittaker, et al.; "Distinctive finite size effects on the phase diagram and metal-insulator transitions of tungsten-doped vanadium(IV) oxide"; J. Mater. Chem.; vol. 21; pp. 5580-5592; 2011 (13 pages).

Jiadong Zhou, et al.; "VO2 thermochromic smart window for energy savings and generation"; Scientific Reports; 2013 (5 pages).

\* cited by examiner

STABLE THERMOCHROMICS POLYMER FILMS WITH VANADIUM DIOXIDE NANOWIRES

CROSS-REFERENCE TO RELATED APPLICATIONS

This application is a Divisional Application of U.S. patent application Ser. No. 15/011,397 filed on Jan. 29, 2016, which is a non-provisional patent application of and claims priority under 35 U.S.C. § 119(e) to U.S. Provisional Patent Application Ser. No. 62/129,363, filed on Mar. 6, 2015, and entitled: "STABLE THERMOCHROMIC POLYMER FILMS WITH VANADIUM DIOXIDE NANOWIRES." The above U.S. Non-provisional and Provisional Applications are hereby incorporated in their entirety.

FIELD OF THE INVENTION

The present invention relates generally to thermochromic polymer films.

BACKGROUND

Ambient infrared radiation may cause undesirable heating of an enclosed space by radiating into the enclosed space through an infrared transmitting window. For example, motor vehicles include windows that, in addition to allowing the driver to see his or her surroundings, act as infrared transmitting windows. One method of regulating transmission of infrared radiation as well as the interior temperature of an enclosed space is through the use of a thermochromic film. A thermochromic material changes its electromagnetic radiation absorption, reflection, and transmission characteristics in response to a change in temperature. For example, a thermochromic material may transmit the majority of incident infrared radiation when at a first temperature and reflect the majority of the incident infrared radiation when at a second temperature.

A thermochromic film, including a thermochromic material, placed over a window may be used to passively regulate the quantity of infrared radiation transmitting through the window and into the enclosed space. For example, a thermochromic film at a temperature of 25 degrees Celsius may transmit a majority of incident infrared radiation and at a temperature of 35 degrees Celsius may reflect the majority of incident infrared radiation. By preventing transmission of infrared radiation into an enclosed space based on a temperature of an enclosed space, the temperature within the space may be regulated.

SUMMARY OF THE INVENTION

In one aspect, a thermochromic device according to one or more embodiments may include a film and a number of vanadium dioxide nanowires disposed within the film. Each of the number of vanadium dioxide nanowires may have an aspect ratio between 10 and 500.

In one aspect, a method of controlling heating according to one or more embodiments may include receiving, using a number of vanadium dioxide nanowires, infrared radiation from a first side of a film; transmitting, using the number of vanadium dioxide nanowires, the received infrared radiation to a second side of the film in response to receiving the infrared radiation; transitioning, using the number of vanadium dioxide nanowires, a phase of the plurality of vanadium dioxide nanowires from a non-conducting phase to a conducting phase in response to an ambient temperature increasing above a phase transition temperature of the vanadium dioxide nanowires; and reflecting, using the number of vanadium dioxide nanowires, the received infrared radiation to the first side of the film in response to the phase transition.

In one aspect, a method of manufacturing a film according to one or more embodiments may include hot extruding a material comprising a polymer and a plurality of vanadium dioxide nanowires on a drum to form a rough film.

Other aspects of the invention will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

Embodiments of the invention relate to thermochromic films. As discussed above, thermochromic films may change their reflection, transmission, and absorption characteristics of incident infrared radiation based on a temperature of the film. In one or more embodiments of the invention, a thermochromic film includes a polymer matrix and vanadium dioxide nanowires disposed within the polymer matrix. The polymer matrix imparts the thermochromic film with flexibility, pliability, and adhesion to a target surface while the vanadium dioxide nanowires impart thermochromicity to the thermochromic film.

Additional embodiments of the invention relate to methods of controlling temperature by regulating infrared radiation transmission into a space. In one or more embodiments of the invention, a thermochromic film including vanadium dioxide nanowires is applied to a surface such as a window. The vanadium dioxide nanowires are configured to be in a non-conducting phase below a phase transition temperature and in a conducting phase above the phase transition temperature. When an ambient temperature in the space is below the phase transition temperature, the vanadium dioxide nanowires are non-conducting and transmit a majority of incident infrared radiation into the space. Transmission of the infrared radiation into the space increases the ambient temperature. When the ambient temperature increases above the phase transition temperature, the vanadium dioxide nanowires phase transitions to conducting. When the vanadium dioxide nanowires phase changes to conducting, the vanadium dioxide nanowires reflect or absorb a majority of the of the incident infrared radiation. Reflection or absorption of the incident infrared radiation prevents infrared heating of the space.

Further embodiments of the invention relate to methods of manufacturing thermochromic films. In one or more embodiments of the invention, a thermochromic film is produced by dispersing vanadium dioxide nanowires in a host matrix to form a composite material. The composite material may be deposited onto a rotating drum by, for example, extrusion to form a vanadium dioxide composite film. The film may be further processed to adjust a thickness of the film. In one or more embodiments of the invention, the film may also be processed to align the vanadium dioxide nanowires to impart polarization dependence to the film. The resulting thermochromic films in accordance with one or more embodiments may exhibit higher stability and reliability over longer periods compared to conventional thermochromic films, and may be used in a variety of applications including but not limited to windows on buildings or automobiles.

One or more embodiments of the invention may provide a thermochromic film that passively regulates the quantity of infrared radiation (700 nm-1 mm wavelength) transmitting through a window and into an enclosed space while maintaining continuous transmission of visible wavelength light (400 nm-700 nm) radiation.

Figure 1A:
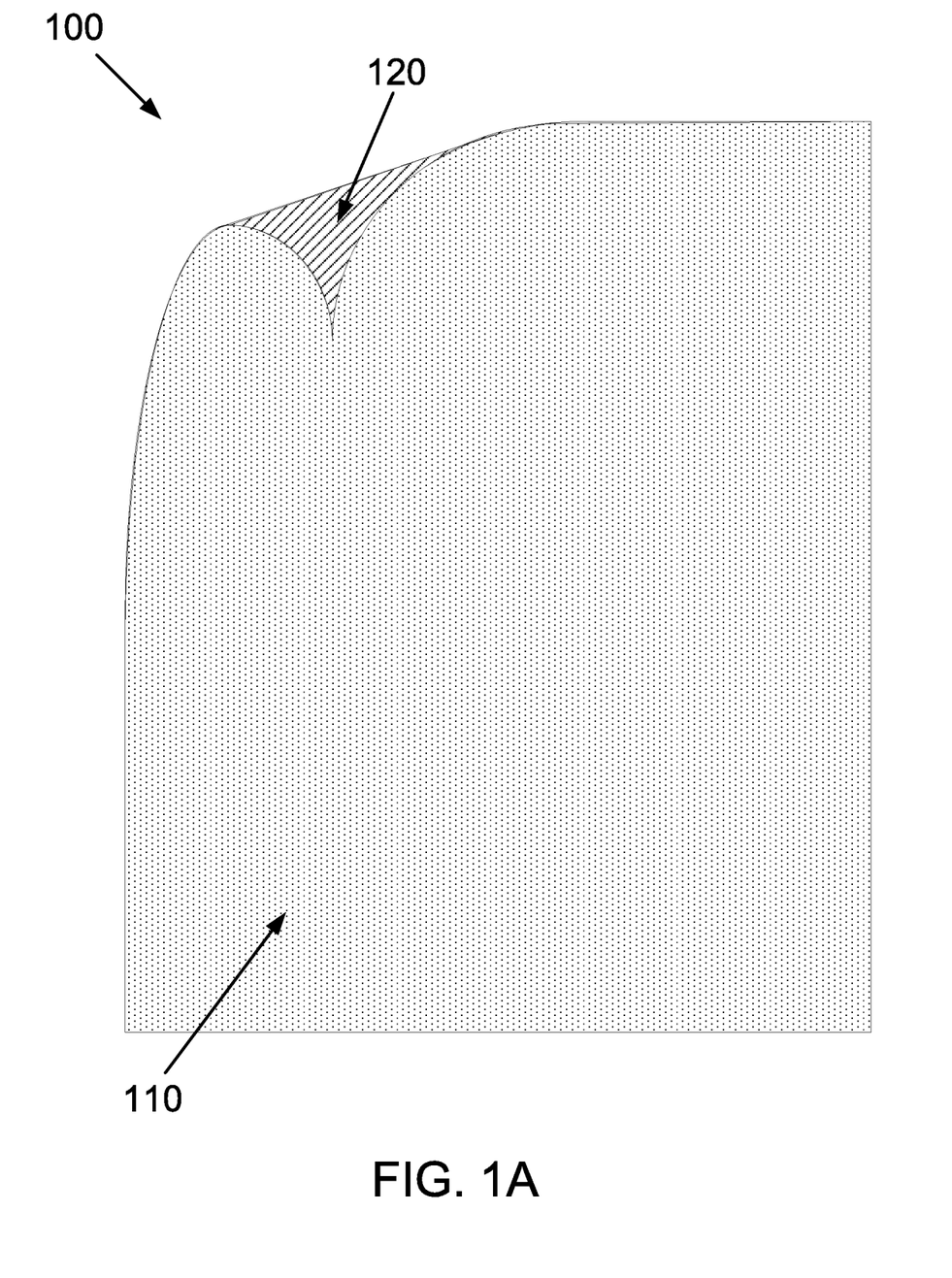
FIG. 1A shows a thermochromic film in accordance with one or more embodiments of the invention.

FIG. 1A shows an example of a thermochromic film (100) in accordance with one or more embodiments of the invention. The thermochromic film (100) includes a front side (110) and a back side (120). The thermochromic film (100) may be placed on or adhered to a target surface such as a glass window. For example, the first surface (110) or second surface (120) may be placed on or adhered to the target surface.

Figure 1B:
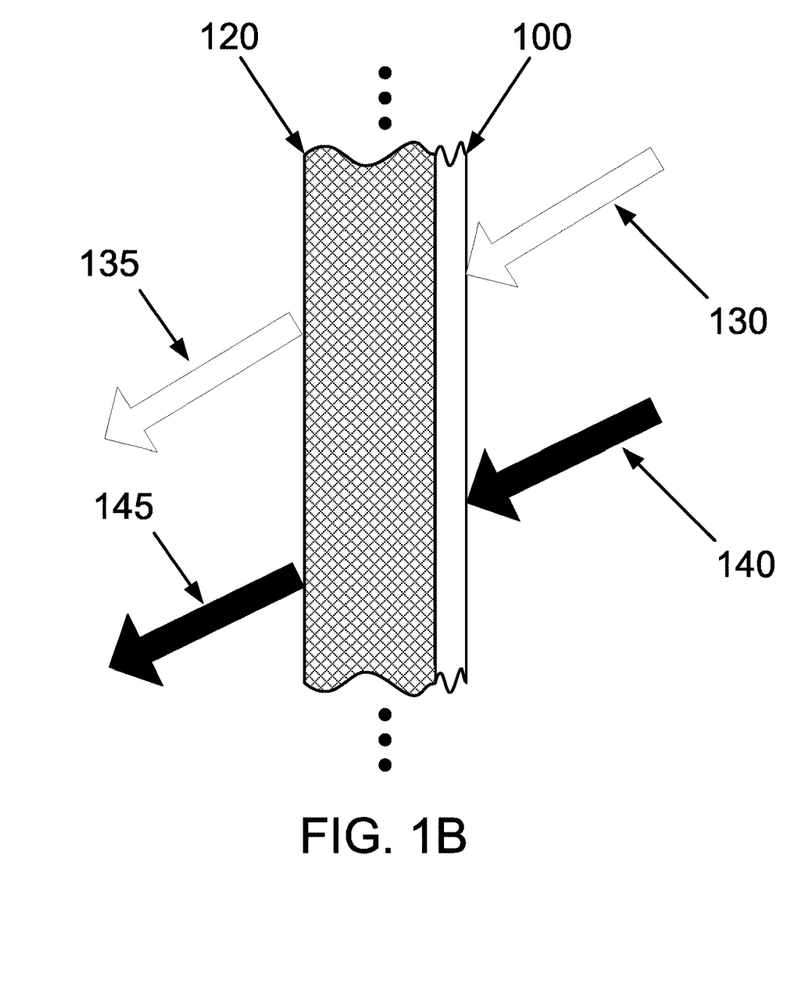
FIG. 1B shows a schematic diagram of a target surface with a thermochromic film in accordance with one or more embodiments of the invention.

FIG. 1B shows a schematic diagram of a target surface (120) with a thermochromic film (100) disposed on the target surface (120) in accordance with one or more embodiments of the invention. When disposed on the target surface (120), the thermochromic film (100) may regulate the transmission of infrared radiation through the combination of the target surface (120) and the thermochromic film (100) based on a temperature of the thermochromic film (100). By regulating the transmission of infrared radiation based on temperature, the thermochromic film (100) controls heating caused by infrared radiation transmitting through the target surface (120) while maintaining continuous transmission of visible wavelength light.

For example, FIG. 1B illustrates the reflection and transmission of optical radiation (130) and infrared radiation (140), incident on the thermochromic film (100), below a phase transition temperature of the thermochromic film (100). When below the phase transition temperature, the thermochromic film (100) may transmit both optical radiation (130) and infrared radiation (140) very efficiently. Thus, the majority of the incident optical radiation (130) may be transmitted (135) through the combination of the target surface (120) and the thermochromic film (100). Similarly, the majority of the infrared radiation (140) may be transmitted (145) through the combination of the target surface (120) and the thermochromic film (100).

Figure 1C:
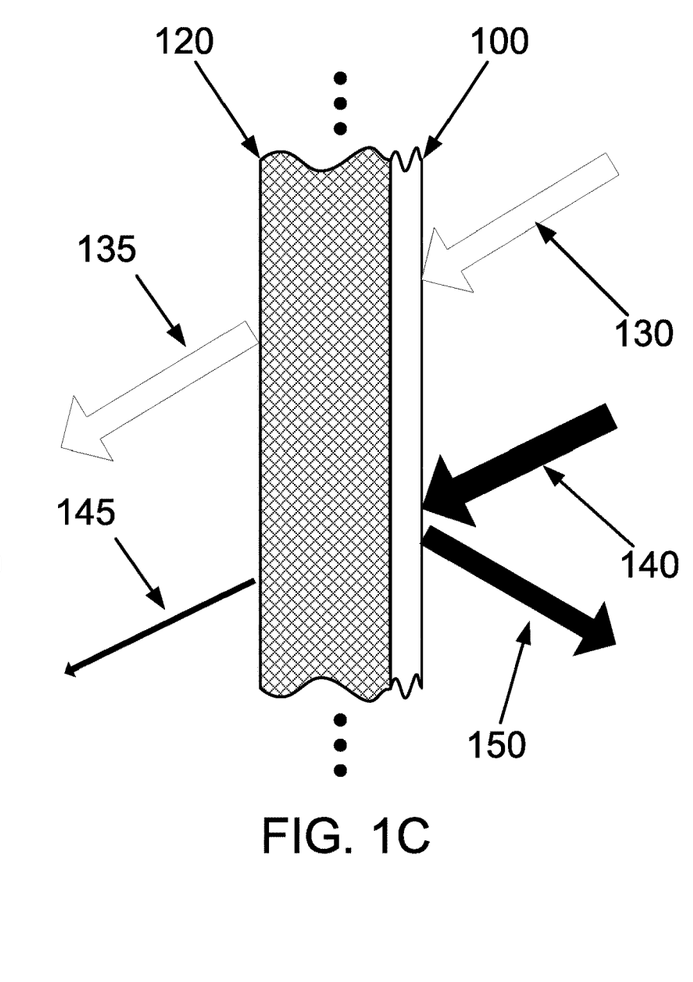
FIG. 1C shows a schematic diagram of a target surface with a thermochromic film in accordance with one or more embodiments of the invention.

In a second example, FIG. 1C illustrates the reflection and transmission of optical radiation (130) and infrared radiation (140), incident on the thermochromic film (100), above a phase transition temperature of the thermochromic film (100). When above the phase transition temperature, the thermochromic film (100) may transmit optical radiation (130) very efficiently but may not transmit infrared radiation (140) efficiently. Thus, the majority of the optical radiation (130) may be transmitted (135) through the combination of the target surface (120) and the thermochromic film (100). However, the majority of the infrared radiation (130) may be reflected (150) by the combination of the target surface (120) and the thermochromic film (100) and very little infrared radiation (140) is transmitted (145).

Figure 2:
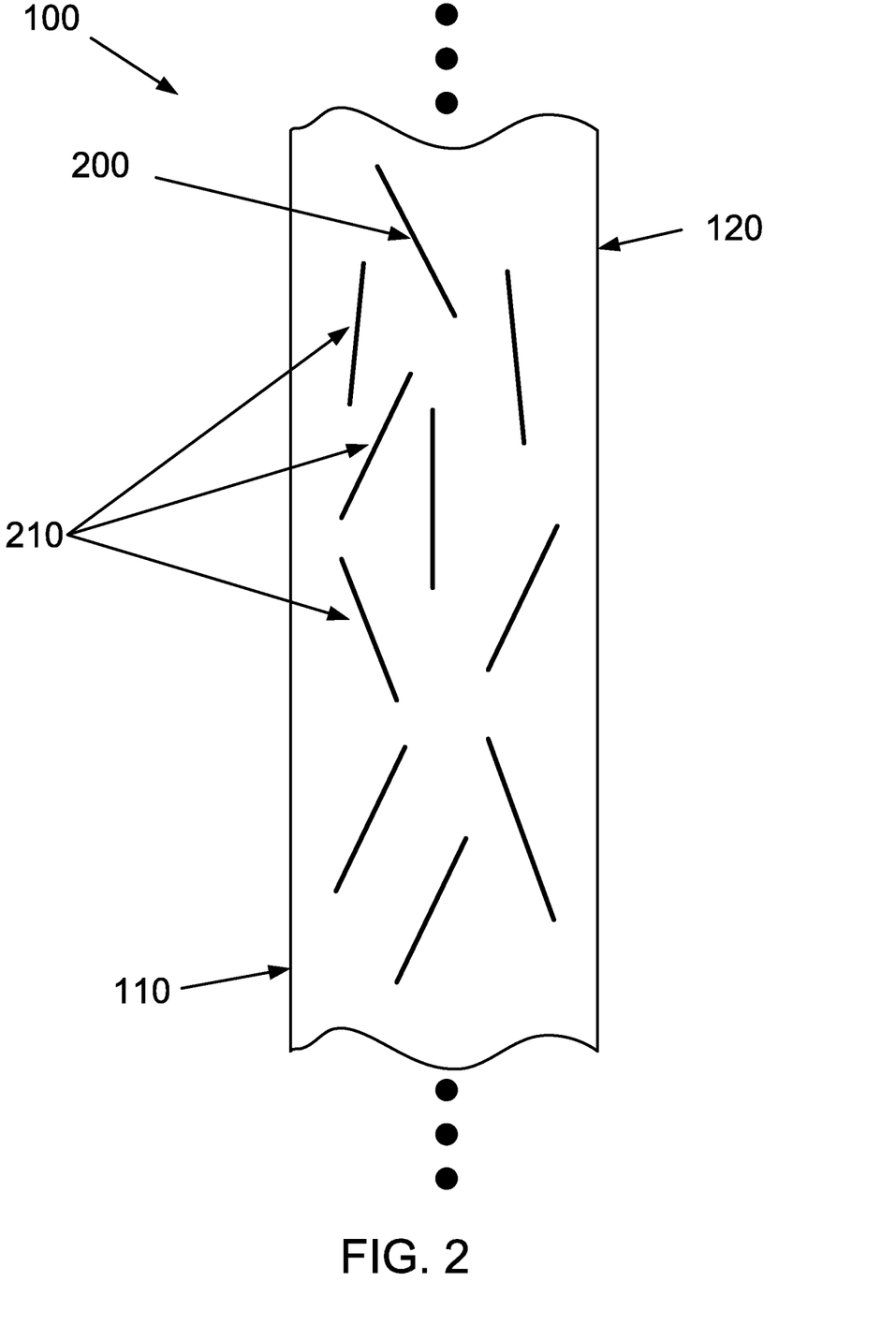
FIG. 2 shows a cross section of a thermochromic film in accordance with one or more embodiments of the invention.

FIG. 2 shows a cross section of the example thermochromic film (100) in accordance with one or more embodiments of the invention. The thermochromic film (100) includes a polymer matrix (200) and vanadium dioxide nanowires (210) disposed within the matrix. The polymer matrix (200) may be a polymer that forms a transparent, flexible substrate. In one or more embodiments of the invention, the polymer matrix is Polyethylene terephthalate (PET).

The vanadium dioxide nanowires (210) may be single crystalline or monocrystalline. Diameters of the single crystal vanadium dioxide nanowires are subwavelength of visual right (typically below ¼ of 400 nm) to avoid haze by scattering of visible right. The vanadium dioxide nanowires may be a solid with constant diameter throughout the entire length. In one or more embodiments of the invention, the vanadium dioxide nanowires (210) are metal doped. Examples of dopant metals include, but are not limited to, tungsten, molybdenum, or a combination of tungsten and molybdenum. Metal doping the vanadium dioxide nanowires (210) may modify a phase transition temperature. The phase transition may be a non-conducting to conducting phase transition. In one or more embodiments of the invention, the non-conducting to conducting phase transition temperature is between 20 degrees and 60 degrees Celsius.

Figure 3:
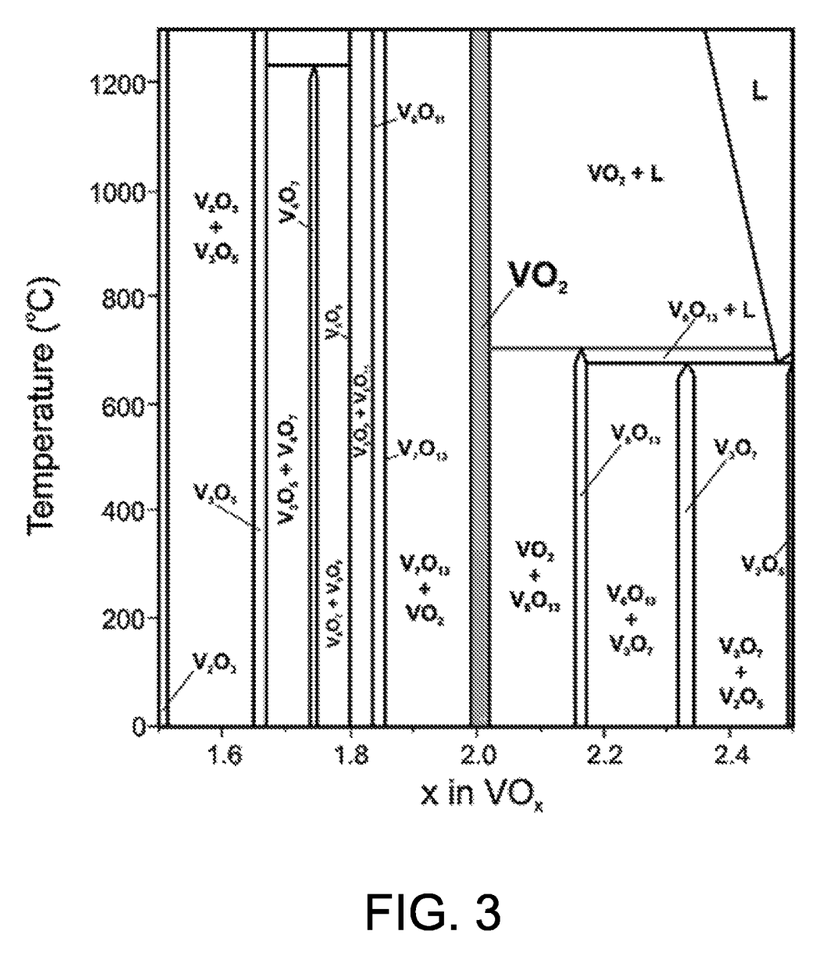
FIG. 3 shows an example phase diagram of vanadium dioxide.

As seen from the phase diagram for vanadium dioxide shown in FIG. 3, vanadium dioxide exhibits a very narrow phase. Specifically, the shaded annotation in FIG. 3 illustrates that the vanadium dioxide phase is highly temperature sensitive. Due to the temperature sensitivity of vanadium dioxide, a desirable phase transition temperature may be imparted to the thermochromic film (100) by the incorporation of the vanadium dioxide nanowires (210).

In one or more embodiments of the invention, the vanadium dioxide nanowires (210) have an average length between 1 μm and 10 μm. In one or more embodiments of the invention, the vanadium dioxide nanowires (210) have an average diameter between 20 nm and 100 nm. In one or more embodiments of the invention, the vanadium dioxide nanowires (210) have a length to diameter aspect ratio between 10 and 500. Such a configuration may improve the longevity of the thermochromic film due to increased resistance against oxidation. The aforementioned physical characteristics of the vanadium dioxide nanowires (210) may impart the thermochromic film (100) with mechanical flexibility, optical translucence, and chemical stability. The vanadium dioxide nanowires (210) with the average diameter between 20 nm and 100 nm are expected to have negligible scattering of visible light. The vanadium dioxide nanowires (210) with an average diameter between 20 nm and 100 nm may produce higher visible light transmission due to subwavelength plasmonic effects when in a metallic state. The vanadium dioxide nanowires (210) with the length to diameter aspect ratio between 10 and 500 maintain flexibility and chemical stability due to reduced oxidation of the surface area. The vanadium dioxide nanowires (210) with the aforementioned diameters and aspect ratio may be easily produced and have stable and long storage life time.

Figure 4:
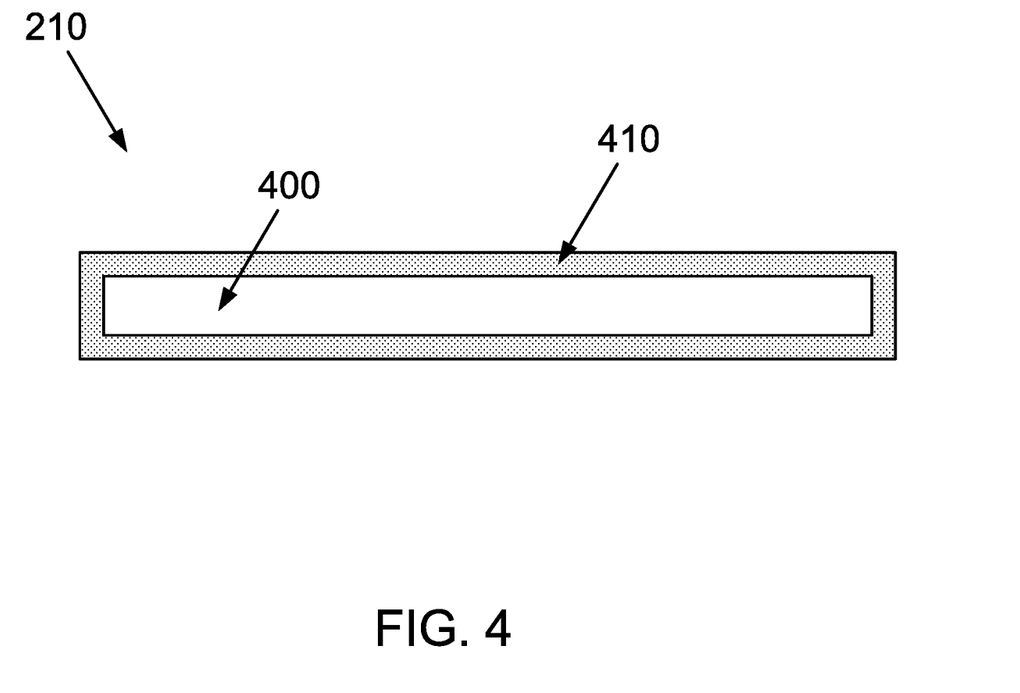
FIG. 4 shows a coated vanadium dioxide nanowire in accordance with one or more embodiments of the invention.

In one or more embodiments of the invention, each vanadium dioxide nanowire (210) may include a shell (410) as shown in FIG. 4. The core (400) of each vanadium dioxide nanowire (210) may be vanadium oxide or metal doped vanadium oxide and the shell (410) may be silica, silicon nitride, titania (titanium dioxide), titanium nitride, or a combination of the aforementioned materials. The shell (410) may chemically passivate or modify the surface and improve the stability of the vanadium dioxide nanowires (210).

Figure 5:
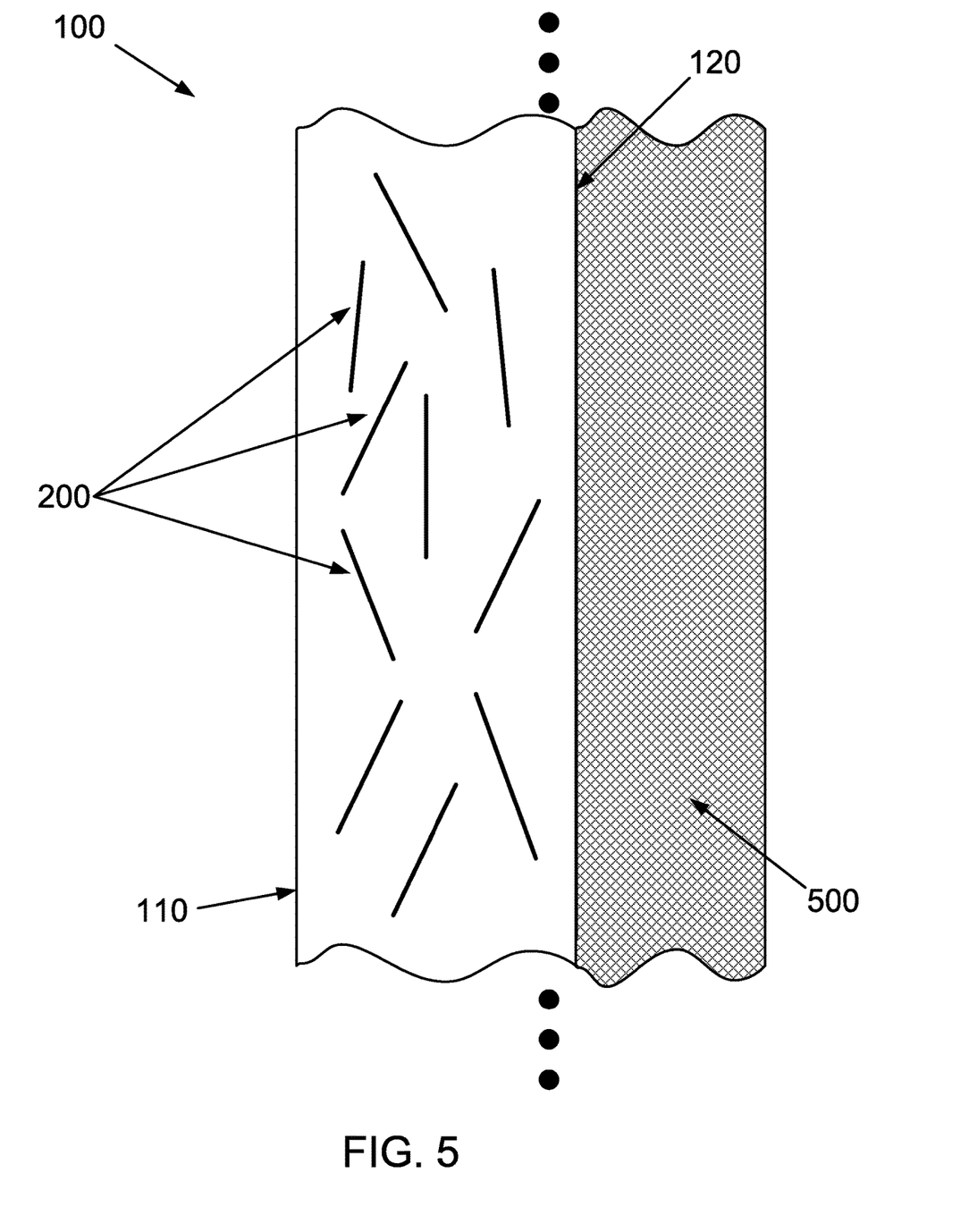
FIG. 5 shows a thermochromic film disposed on a target surface in accordance with one or more embodiments of the invention.

FIG. 5 shows a thermochromic film (100) disposed on a target surface (500). The thermochromic film (100) may be attached to the target surface (500) by, for example, heating and pressure, chemical adhesion, or any method as known in the art. When the thermochromic film (100) is disposed on the target surface (500), the infrared transmission, reflection, and absorption characteristics of the thermochromic film (100) are imparted to the combination of the target surface (500) and the thermochromic film (100). For example, if the target surface (500) is a glass surface, the glass surface alone transmits infrared radiation regardless of temperature. When the thermochromic film (100) is disposed on the target surface (500), the transmission of infrared radiation is modified based on the infrared transmission characteristics of the thermochromic film (100).

Figure 6A:
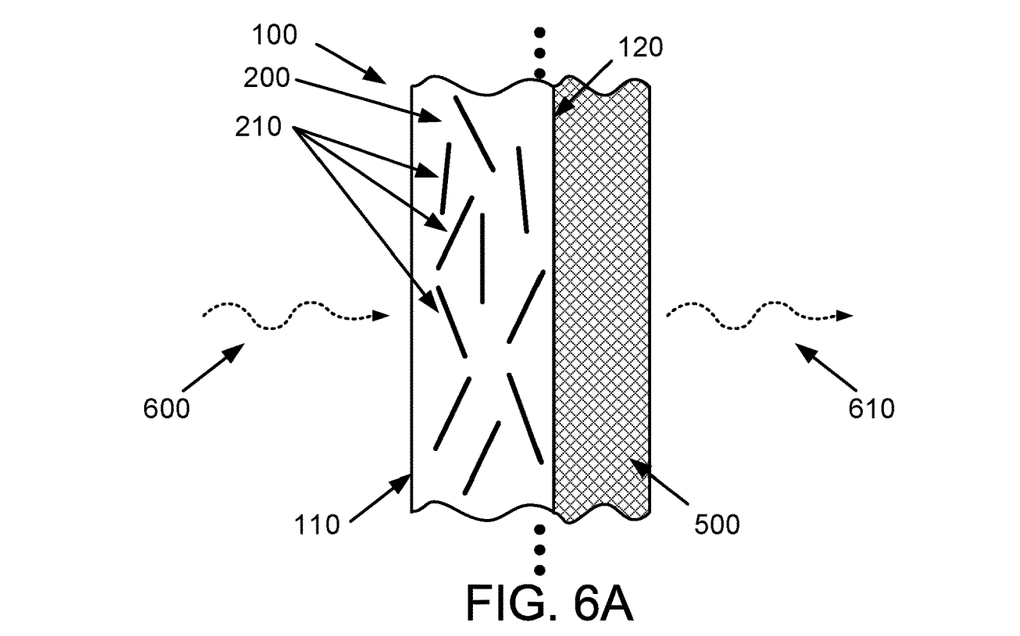
FIG. 6A shows the infrared radiation characteristics of a thermochromic film below a phase transition temperature in accordance with one or more embodiments of the invention.
Figure 6B:
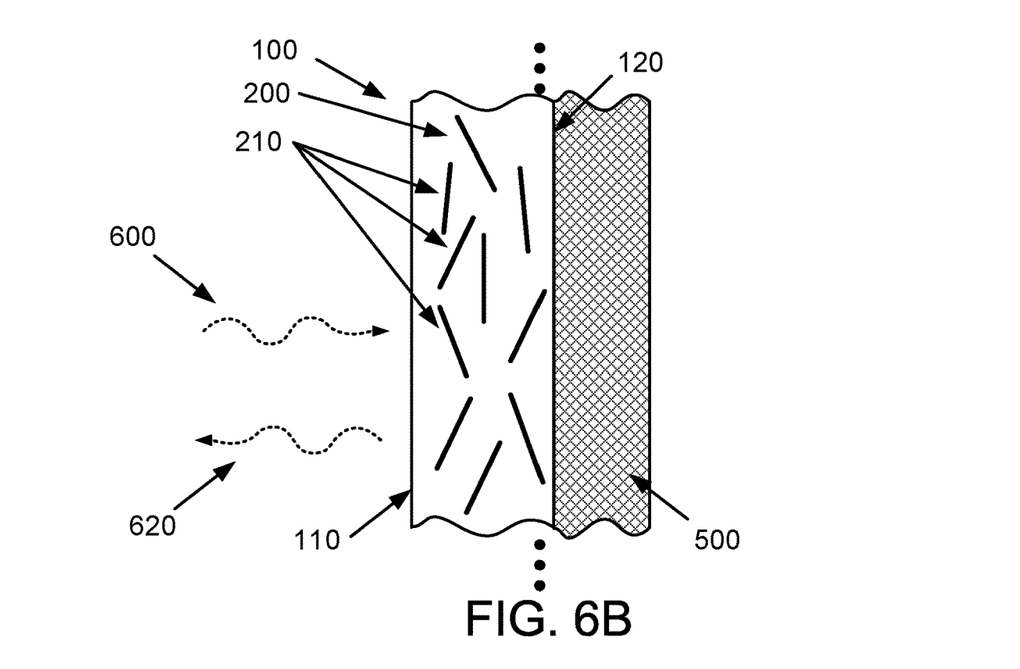
FIG. 6B shows the infrared radiation characteristics of a thermochromic film above a phase transition temperature in accordance with one or more embodiments of the invention.

FIGS. 6A and 6B illustrate the infrared transmission characteristics of the combination of the thermochromic film (100) and a target surface (500) below and above a phase transition temperature, respectively.

FIG. 6A illustrates the infrared transmission characteristics of the combination of the thermochromic film (100) and the target surface (500) below the phase transition temperature in accordance with one or more embodiments of the invention. When the thermochromic film (100) is below the phase transition temperature of the vanadium dioxide nanowires (200), the vanadium dioxide nanowires (200) are non-conducting. When the vanadium dioxide nanowires (200) are non-conducting, the majority of incident infrared radiation (600) is transmitted through the combination of the thermochromic film (100) and the target surface (500). The transmitted infrared radiation is radiated as transmitted infrared radiation (610).

In contrast, when the thermochromic film (100) is above the phase transition temperature of the vanadium dioxide nanowires (200) as shown in FIG. 6B, the vanadium dioxide nanowires (200) are conducting. When the vanadium dioxide nanowires (200) are conducting, the majority of incident infrared radiation (600) is not transmitted through the combination of the thermochromic film (100) and the target surface (500). The infrared radiation is instead radiated as reflected or re-radiated infrared radiation (620) if absorbed by the vanadium dioxide nanowires (210).

Figure 7:
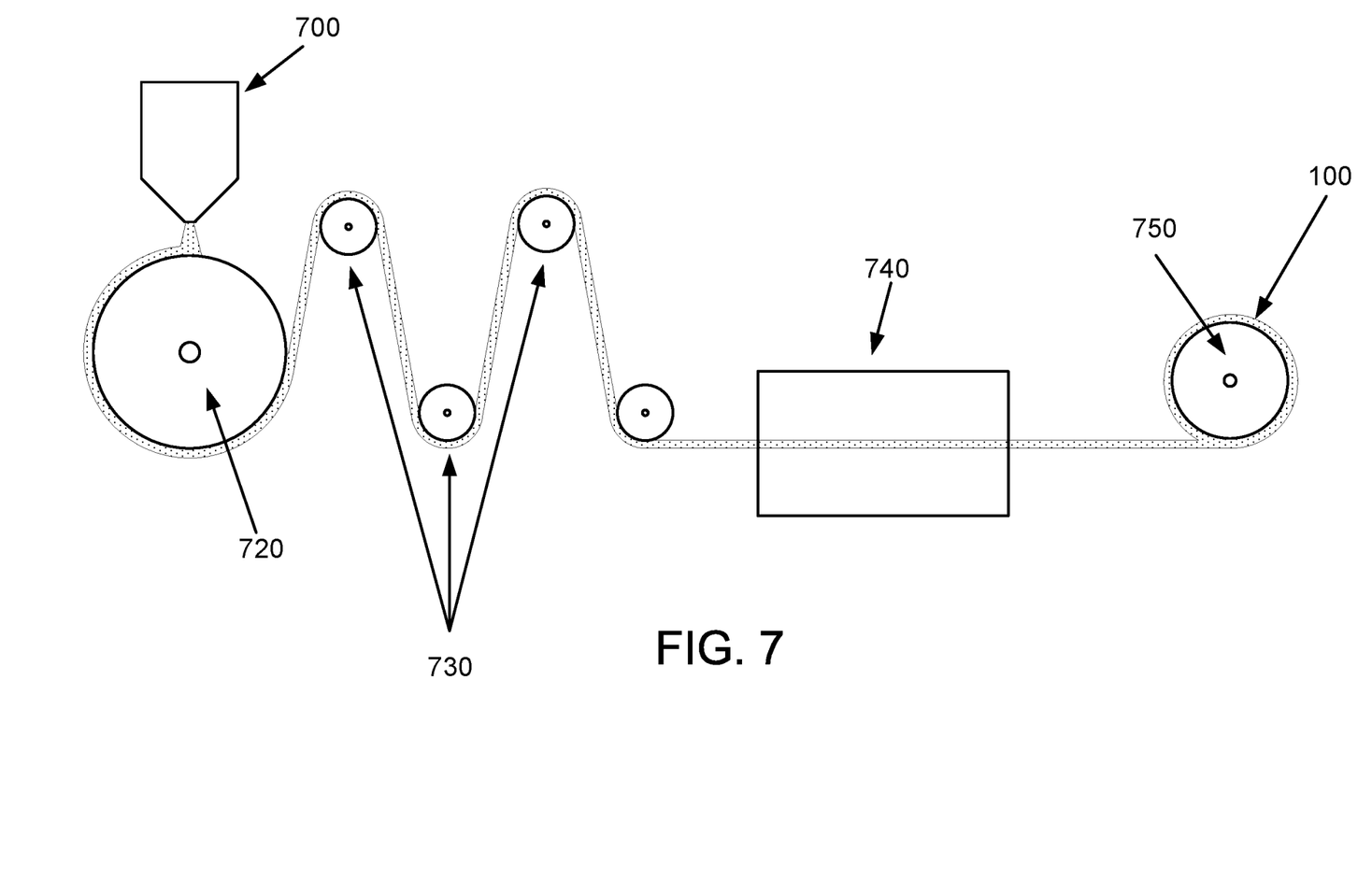
FIG. 7 shows a thermochromic film manufacturing process in accordance with one or more embodiments of the invention.

In accordance with one or more embodiments of the invention, a thermochromic film (100) may be manufactured using a hot extruding method as shown in FIG. 7. A polymer matrix and vanadium dioxide nanowires (not shown) may be fed to an extruder (700). The extruder (700) may mix the polymer matrix and vanadium dioxide nanowires to form a composite material. In one or more embodiments, the fill factor of the composite material (between the vanadium dioxide nanowires and the polymer matrix) is between 0.01 and 0.5. This may provide high thermochromic efficiency with low transparency films as well as low thermochromic efficiency with high transparency films. The extruder (700) may extrude the composite material onto a receiving drum (720). By extruding the composite material onto the receiving drum (720), a rough thermochromic film may be formed on the surface of the receiving drum (720).

The rough thermochromic film may be fed from the receiving drum (720) to a series of rollers (730). When received by the series of rollers (730), the rough thermochromic film may be thick and uneven. The series of rollers (730) may apply tension along the length of the rough thermochromic film. Applying tension along the length of the thermochromic film may draw the rough thermochromic film to reduce the thickness to a desired value as well as reduce variations in the thickness of the rough thermochromic film.

The rough thermochromic film may be fed to a heating unit (740) that raises the temperature of the rough thermochromic film to a desired value and cools the film to a second desired temperature. By heating and cooling the rough film, the polymer matrix within the thermochromic film may plasticize and then recrystallize. Plasticizing and recrystallizing the polymer matrix may improve translucency and mechanical properties to form the thermochromic film (100). The thermochromic film (100) may be received on a bobbin (750) for transport to a customer.

Figure 8:
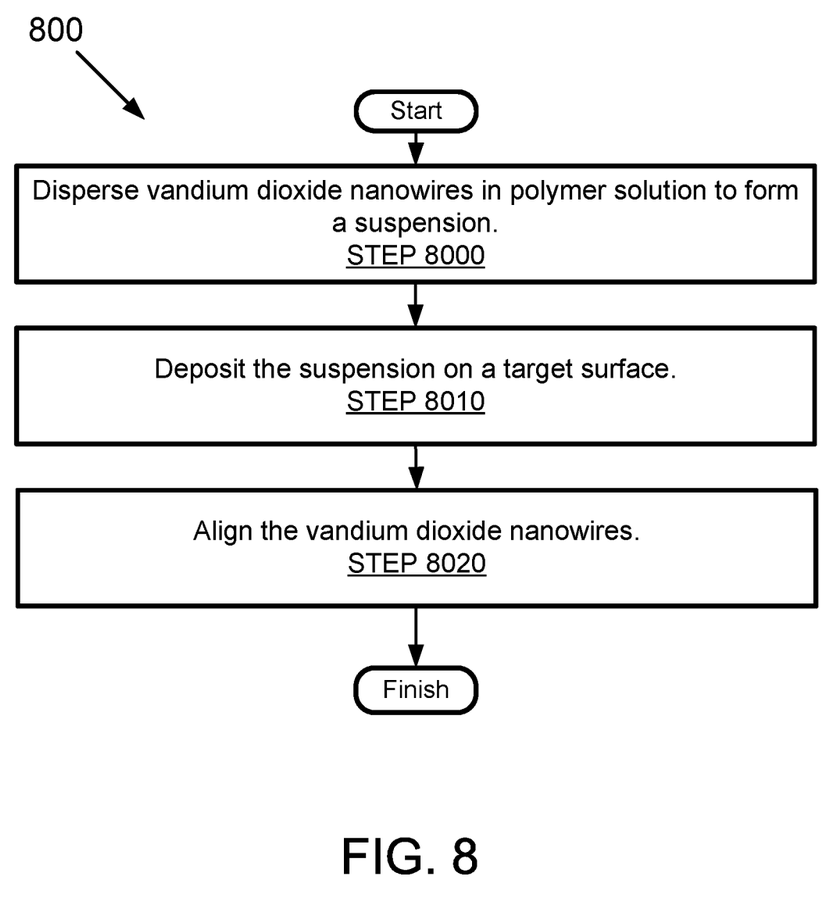
FIG. 8 shows a flowchart of a thermochromic film manufacturing process in accordance with one or more embodiments of the invention.

FIG. 8 shows a flowchart (800) according to one or more embodiments of the invention. The method depicted in FIG. 8 may be used to manufacture a thermochromic film (100) in accordance with one or more embodiments of the invention. One or more steps shown in FIG. 8 may be omitted, repeated, and/or performed in a different order among different embodiments.

At Step 8000, vanadium dioxide nanowires are dispersed in a polymer solution to form a suspension. As discussed above, the vanadium dioxide nanowires my include a shell, have a diameter between 20 nm and 100 nm, and have a length to diameter aspect ratio between 10 and 500. In one or more embodiments of the invention, the polymer solution is polyethylene terephthalate (PET), Polyethylene naphthalate (PEN), Triacetate (TAC), Polytetrafluoroethylene (PTFE), or a combination of the aforementioned polymer solutions.

In one or more embodiments of the invention, a surface functionalization agent may be added to the polymer solution. The surface functionalization agent may be a hydrophobic functionalization agent, i.e., an agent that renders a surface hydrophobic. In one or more embodiments, the hydrophobic surface is uniformly dispersed in polymer solution with polar solvent, such as ethanol, methanol and water. For example, the agent may add organic-tails to a surface or fluorinate the surface. The surface functionalization layer may improve the suspension characteristics of the vanadium dioxide nanowires in the polymer solution.

In one or more embodiments of the invention, a disperser chemical, e.g., a surfactant, may be added to the polymer solution to obtain uniformly dispersed solution or improve the suspension characteristics of the vanadium dioxide nanowires in the polymer solution. In one or more embodiments of the invention, the surfactant may contain both hydrophobic and hydrophilic components. Further, in one or more embodiments of the invention, the surfactant may contain both oil soluble and insoluble components.

In one or more embodiments of the invention, a thermochromic film may have a volumetric filling factor of nanowires between 0.01 and 0.5. A thermochromic film with a low filling factor may be used in the case where high visible light transmission is required, and a thermochromic film with a high filing factor may be used for the case where low visible light transmission is acceptable.

Figure 9:
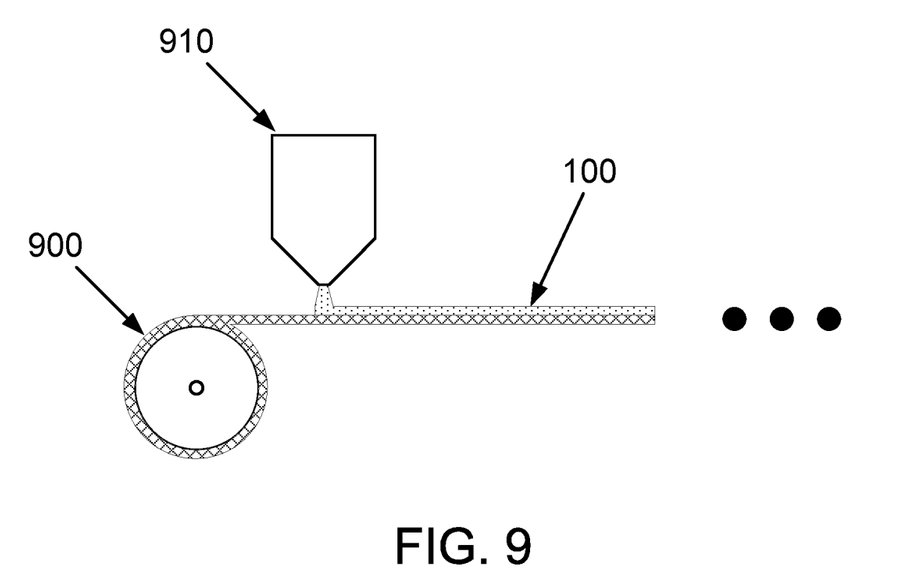
FIG. 9 shows an example of a second thermochromic film manufacturing process in accordance with one or more embodiments of the invention.

At Step 8010, the suspension is deposited onto a target surface. The suspension may, for example, be deposited onto the target surface as shown in FIG. 9. As seen in FIG. 9, a substrate (900) may be continuously moved underneath a deposition head (910). The deposition head (900) may be a sprayer, drip, slot die, Gravure, or spin coating in a roll-to-roll coater.

Returning to FIG. 8, at Step 8020, the vanadium dioxide nanowires may be aligned. Following Step 8010, the vanadium dioxide nanowires may be randomly aligned within the thermochromic film. Alignment of the vanadium dioxide nanowires may be useful. For example, alignment may impart polarization dependence or otherwise modify the infrared radiation transmission characteristics of the thermochromic film.

Figure 10A:
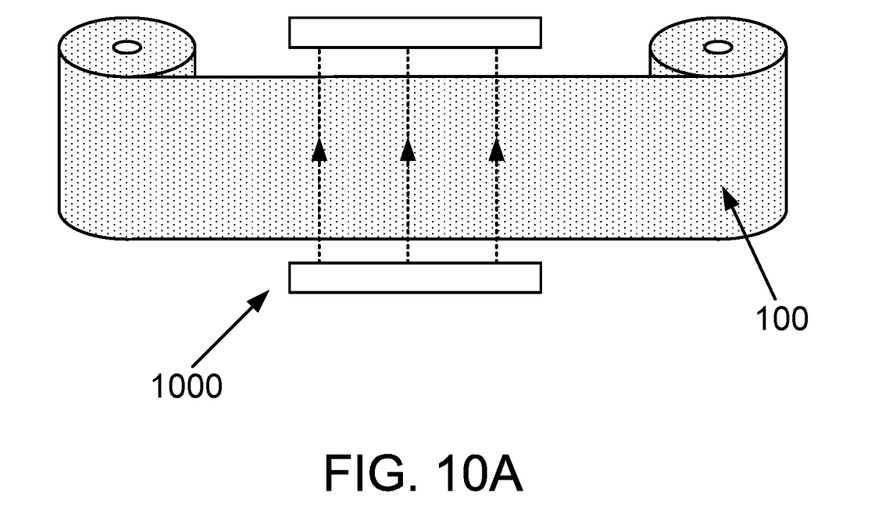
FIG. 10A shows a method of aligning vanadium dioxide nanowires in accordance with one or more embodiments of the invention.
Figure 10B:
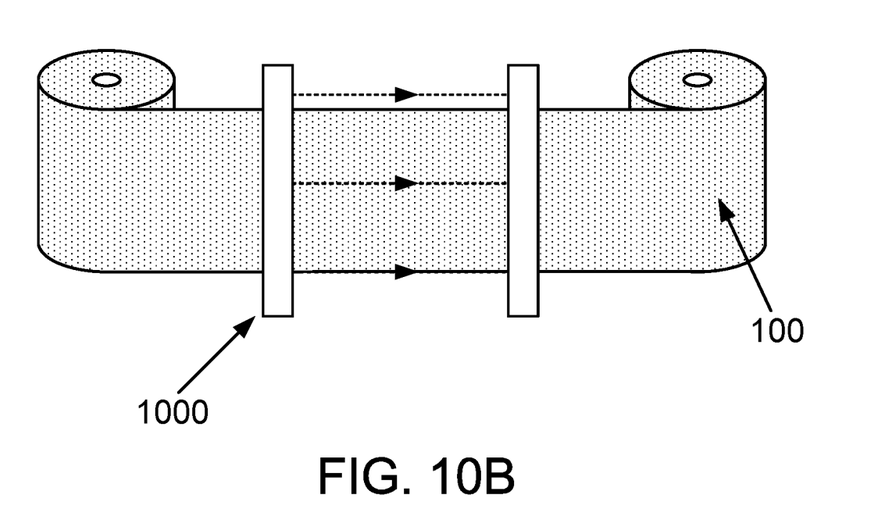
FIG. 10B shows a second method of aligning vanadium dioxide nanowires in accordance with one or more embodiments of the invention.

In one or more embodiments of the invention, the vanadium dioxide nanowires are aligned by the application of both heat and an electric field, as shown in FIGS. 10A and 10B. As discussed above, vanadium dioxide nanowires exhibit a phase transition from non-conducting to conducting. To align the vanadium dioxide nanowires, the thermochromic film is heated to a temperature above the phase transition temperature which renders the vanadium dioxide nanowires conducting. Once heated, an electric field is applied. Force is applied to any of the now conducting vanadium dioxide nanowires in a direction that orients the vanadium dioxide nanowire in the direction of the electric field.

As shown in FIG. 10A, the vanadium dioxide nanowires within the thermochromic film (100) may be aligned transversely to the length of the thermochromic film (100) by applying heat and an electric field (1000) oriented transversely to the length of the thermochromic film (100). Alternatively, as shown in FIG. 10B, the vanadium dioxide nanowires within the thermochromic film (100) may be aligned along the length of the thermochromic film (100) by applying heat and an electric field (1000) oriented along the length of the thermochromic film (100).

Figure 11:
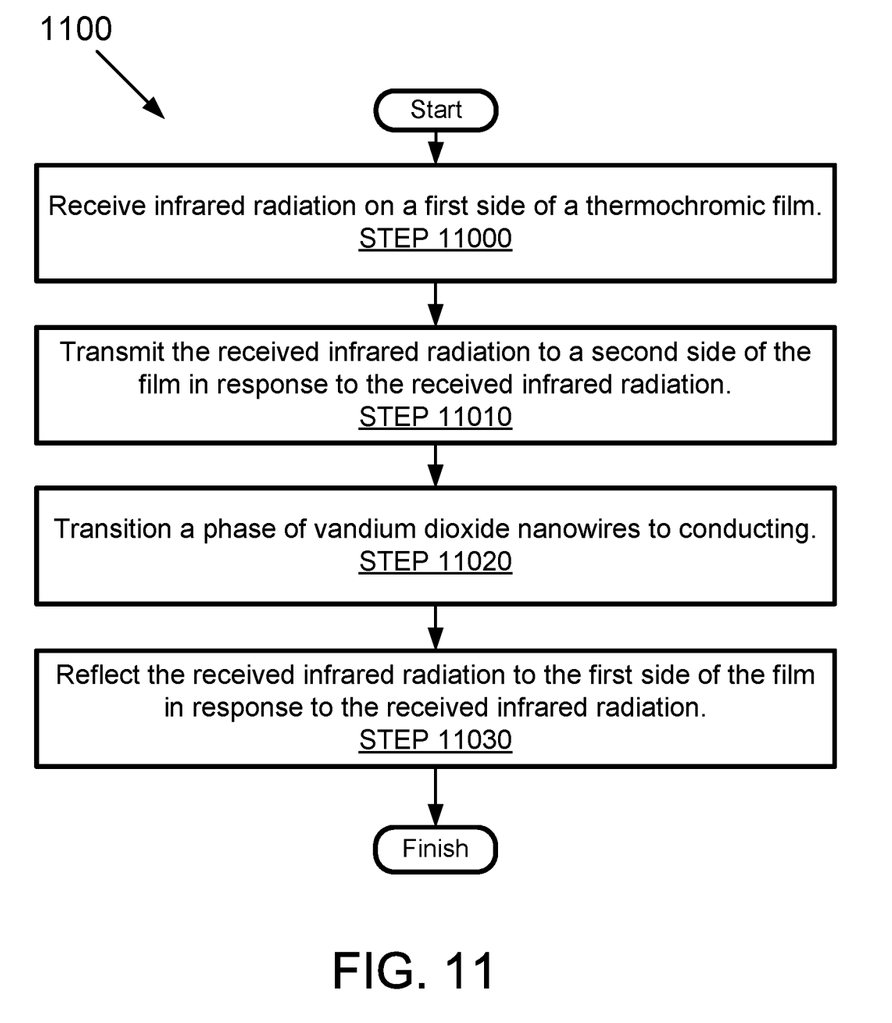
FIG. 11 shows a flowchart of a method of controlling heating by infrared radiation in accordance with one or more embodiments of the invention.

FIG. 11 shows a flowchart (1100) according to one or more embodiments of the invention. The method depicted in FIG. 11 may be used to control heating by infrared radiation in accordance with one or more embodiments of the invention. One or more steps shown in FIG. 11 may be omitted, repeated, and/or performed in a different order among different embodiments.

At Step 11000, infrared radiation is received on a first side of a thermochromic film. The thermochromic film includes vanadium dioxide nanowires in a non-conducting phase. In one or more embodiments of the invention, the infrared radiation is ambient infrared radiation.

At Step 11010, the received infrared radiation is transmitted to a second side of the film. The transmitted infrared radiation is then radiated out of the second side of the film.

At Step 11020, a phase of the vanadium dioxide nanowires is transitioned to conducting. For example, the temperature of the thermochromic film may increase above a phase transition temperature of the vanadium dioxide nanowires.

At Step 11030, the received infrared radiation is reflected to the first side of the film in response to the phase transition of the vanadium dioxide nanowires.

The steps shown in FIG. 11 limit the transmission of infrared radiation based on a temperature. By preventing the transmission of infrared radiation above the temperature, heating by infrared radiation is prevented which regulates the temperature.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method of manufacturing a film, comprising:
   mixing a polymer and a plurality of vanadium dioxide nanowires;
   forming a finished film with the mixture of the polymer and the plurality of vanadium dioxide nanowires;
   heating the plurality of vanadium dioxide nanowires above a non-conducting to conductor phase transition temperature of the vanadium dioxide;
   applying an electric field to orient each of the plurality of vanadium dioxide nanowires while above the phase transition temperature; and
   modifying optical characteristics of the finished film with transmission characteristics and polarization dependence of the oriented plurality of vanadium dioxide nanowires.

2. The method of claim 1, wherein
   forming the finished film comprises:
   hot extruding the mixture of the polymer and the plurality of vanadium dioxide nanowires on a drum to form a rough film; and
   drawing the rough film along a plurality of rollers along a length of the rough film.

3. The method of claim 1, wherein
   each of the plurality of vanadium dioxide nanowires is oriented along a length of the finished film.

4. The method of claim 3, wherein each of the plurality of vanadium dioxide nanowires is oriented by additionally applying a tension along the length of the finished film.

5. The method of claim 1, wherein
   each of the plurality of vanadium dioxide nanowires is oriented along a width of the finished film.

6. The method of claim 5, wherein each of the plurality of vanadium dioxide nanowires is oriented by additionally applying a tension along the width of the finished film.

7. The method of claim 2, wherein
forming the finished film further comprises:
- plasticizing the rough film by heating to a first predetermined temperature; and
- recrystallizing the rough film by cooling to a second predetermined temperature.

8. The method of claim 1, wherein
forming the finished film comprises:
- forming a suspension that includes the mixture of the polymer and the plurality of vanadium dioxide nanowires; and
- depositing the suspension on a substrate.

9. The method of claim 8, wherein
the suspension further includes a surface functionalization agent that disperses the plurality of vanadium dioxide nanowires in the polymer.

10. The method of claim 8, wherein
the suspension further includes a surfactant that disperses the plurality of vanadium dioxide nanowires in the polymer.

* * * * *